March 16, 1926.  
G. C. ROHDE  
1,577,299  
PINION GEAR HOLDER  
Filed Jan. 19, 1921
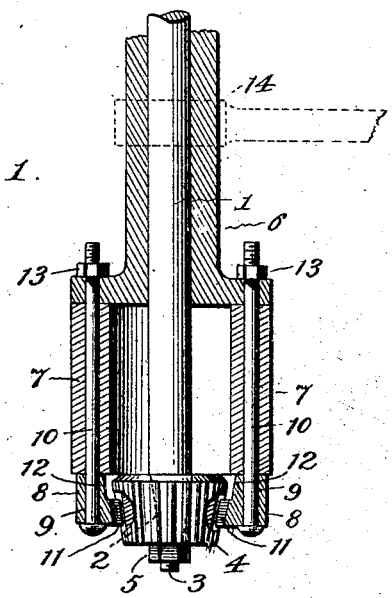
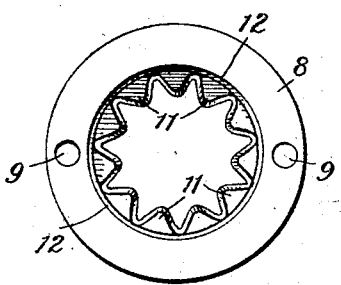
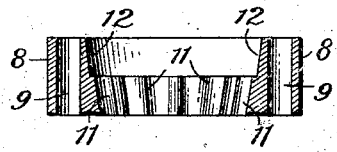
Witness:  
Jas. E. Hutchinson
Inventor:  
George C. Rohde,  
By Bollinger & Block, Attorneys.

Patented Mar. 16, 1926.

1,577,299

UNITED STATES PATENT OFFICE.

GEORGE C. ROHDE, OF DAVENPORT, IOWA.

PINION-GEAR HOLDER.

Application filed January 19, 1921. Serial No. 438,376.

*To all whom it may concern:*

Be it known that I, GEORGE C. ROHDE, a citizen of the United States, residing at Davenport, in the county of Scott, State of Iowa, have invented certain new and useful Improvements in Pinion-Gear Holders, of which the following is a specification, reference being had therein to the accompanying drawing.

My invention relates to new and useful improvements in a pinion gear holder and has for its principal object the provision of a device adapted to hold a pinion gear and its associated shaft against rotation while removing the nut which holds the gear upon the shaft.

Another object consists in the construction of the device in such a manner that it may be secured to a support such as the shaft housing or the object through which the shaft passes and is rotatably supported.

A further object resides in constructing the holder so that it may be adapted for use with gears of various diameters.

With the above and other objects in view my invention consists in the novel details of construction and arrangement of parts which will be more clearly understood from the following specification and drawings. and while I have illustrated and described the preferred embodiment of the invention it will be understood that such changes may be made as will fall within scope of the appended claims.

In the drawings:—

Figure 1 is a longitudinal vertical section through the gear, the gear holder, roller bearing casing and a portion of the shaft housing, with the shaft, nut and connecting bolts shown in elevation.

Figure 2 is a face view of the holder.

Figure 3 is a horizontal section through the holder.

While my holder may be used for holding gears used for various purposes, it is primarily intended for holding the gear carried by the drive shaft of an automobile. When it is desired to remove the pinion gear from the drive shaft of an automobile, it is necessary to hold the shaft and gear against rotation while removing the nut which holds the gear upon the shaft. This ordinarily requires the services of two persons, one to hold the shaft against rotation in the shaft housing and the other to remove the nut. With the use of my holder one person only is required for removing the nut as the holder prevents the shaft from rotating in the housing while the nut is being removed.

In the drawings, 1 indicates a drive shaft its end being beveled as shown at 2 and threaded as at 3. A pinion gear 4 is received on the beveled portion 2 and is held thereon by a nut 5 received on the threaded portion 3. The shaft support or housing is shown at 6 and has secured thereto the roller bearing casing or housing 7 for enclosing roller bearings of usual construction, not shown. This roller bearing casing is secured to the flanged end of the shaft housing by means of a plurality of bolts in the usual manner.

My improved holder is indicated at 8 and has a plurality of openings 9 therethrough adapted to receive the bolts 10 for securing the holder to the end of the roller bearing casing 7 or other support. While I have only illustrated two openings 9 as being provided, it will be understood that any desired number may be provided as found necessary in actual use. The bolts 10 are those bolts which normally secure the roller bearing casing to the end of the shaft housing and to the rear axle housing of the automobile. Inwardly extending teeth 11 are formed adjacent one face of the holder 8, and as more clearly shown in Fig. 3 the interior bore of the holder is inclined as shown at 12 for a purpose which will later appear. Nuts 13 will be received on the threaded ends of the bolts 10 and engage the outer face of the holder.

With the parts assembled as shown in Fig. 1 of the drawings, the holder being connected to the bearing casing and shaft housing or other support and the teeth 11 engaging the teeth of the pinion gear 4, the gear and shaft will be held against rotation with respect to the said casing and housing. The housing may be engaged in a vise 14, indicated in dotted lines, and this vise may be either of the hand or bench type. When thus held the nut 5 may be easily removed by one person. The center bore being inclined as shown at 12 allows the holder to properly fit over the pinion gear and the holder may be used with gears of varying diameters. It will be seen that I have provided a holder adapted for use in connection with any object or support through which a shaft extends and is adapted to rotate. All that is necessary is to secure the holder to the object so that the teeth 11 will engage the teeth of the pinion gear.

Having fully described my invention what I claim as new and desire to secure by Letters Patent is:—

1. A device for holding a shaft, having a gear thereon against rotation in a support, said device being adapted to be connected to the support and having means intermeshable with the teeth of the gear for holding said gear and shaft against rotation relative to the support.

2. A device for holding a shaft, having a tapered gear thereon against rotation in a support, said device adapted to be secured to the support and having a tapered bore to receive the gear and teeth to intermesh with the gear for holding said gear and shaft against rotation relative to the support, the tapering bore of the device allowing the same to be drawn over the gear and into engagement therewith.

3. A device for holding a shaft, having a gear secured thereon against rotation in a support while releasing the gear securing means, said device comprising a ring-like member adapted to be secured to the support with the gear securing means projecting therethrough and having teeth on the interior thereof intermeshable with the teeth of the gear.

In testimony whereof I hereunto affix my signature.

GEORGE C. ROHDE.